United States Patent
Hutner

[15] 3,704,999
[45] Dec. 5, 1972

[54] AUTOMATIC STOP CIRCUIT FOR MOTION PICTURE PROJECTOR

[72] Inventor: Mark A. Hutner, Glenview, Ill.
[73] Assignee: Elco Corporation, Jenkintown, Pa.
[22] Filed: July 29, 1970
[21] Appl. No.: 59,226

[52] U.S. Cl. .................. 352/92, 352/17, 352/169, 352/180, 352/236
[51] Int. Cl. .................................................. G03b 21/48
[58] Field of Search ........... 352/92, 180, 236, 169, 17

[56] References Cited

UNITED STATES PATENTS

| | | | |
|---|---|---|---|
| 3,353,688 | 10/1970 | Paintop | 352/169 X |
| 2,892,900 | 6/1959 | Guttwein | 352/17 X |
| 3,432,228 | 3/1969 | Hellmund | 352/169 |
| 1,944,024 | 1/1934 | Foster | 352/92 |
| 3,447,864 | 6/1969 | Shadley | 352/17 |
| 3,520,596 | 7/1970 | O'Donnell et al. | 352/92 |

Primary Examiner—Louis R. Prince
Assistant Examiner—Frederick Shoon
Attorney—D. R. Pressman

[57] ABSTRACT

A sound motion picture projector which includes a control circuit responsive to the presence of an audio signal having a predetermined frequency on the sound track of the film being projected to interrupt the film drive means, whereby a particular frame of the film may be automatically projected as a still picture.

6 Claims, 2 Drawing Figures

PATENTED DEC 5 1972

INVENTOR
Mark A. Hutner

AUTOMATIC STOP CIRCUIT FOR MOTION PICTURE PROJECTOR

BACKGROUND OF THE INVENTION

This invention relates generally to improvements in control circuits for sound motion picture projectors. More specifically, it relates to improvements in the circuits for controlling the running of such projectors.

It is known in the prior art to provide means for stopping a motion picture projector so as to display for a period of time a particular frame on the film. This has been done by providing some sort of slot, opening or cut-out on the film adjacent the frame which it is desired to display as a still picture and a mechanical means to engage in the slot, cut-out or opening and by so doing disenable the film drive mechanism. This approach necessitates a more or less permanent alteration of the film and may effect its quality or life. Also, once the film is altered, it is relatively difficult to change the location of the desired stop point or to add a new one. In addition, the cost of producing the film is increased.

Therefore, it is an object of this invention to provide a novel means for stopping a motion picture projector in order to project a particular frame as a still picture which does not necessitate any physical alteration of the film.

It is another object of this invention to provide a novel means for automatically stopping the film to display a particular frame as a still picture which does not depend on the interaction of any mechanical device with the film.

It is a further object of this invention to provide a novel means for automatically stopping a motion picture projector to display a particular frame as a still picture which utilizes control means which are solid state electrical.

It is a still further object of this invention to provide a novel means for automatically stopping a motion picture projector to display a particular frame as a still picture which includes a means whereby the particular frame chosen may be changed or additional frames added without physical alteration of the film.

SUMMARY OF THE INVENTION

The foregoing and other objects of this invention are achieved in one embodiment by providing a control circuit responsive to a selected audio signal recorded on the sound track of a film being projected which control circuit is effective to stop the film drive mechanism so as to permit the display of a selected frame as a still picture.

The invention itself is defined in the claims appended hereto and forming a part of this specification, while an understanding of the structure and mode of operation of an embodiment thereof may be derived from the detailed description taken in conjunction with the drawings which:

FIG. 1 is a schematic illustration of a sound motion picture projector embodying the invention; and FIG. 2 is a schematic illustration of a control circuit in accordance with the invention.

DETAILED DESCRIPTION

Figure 1:
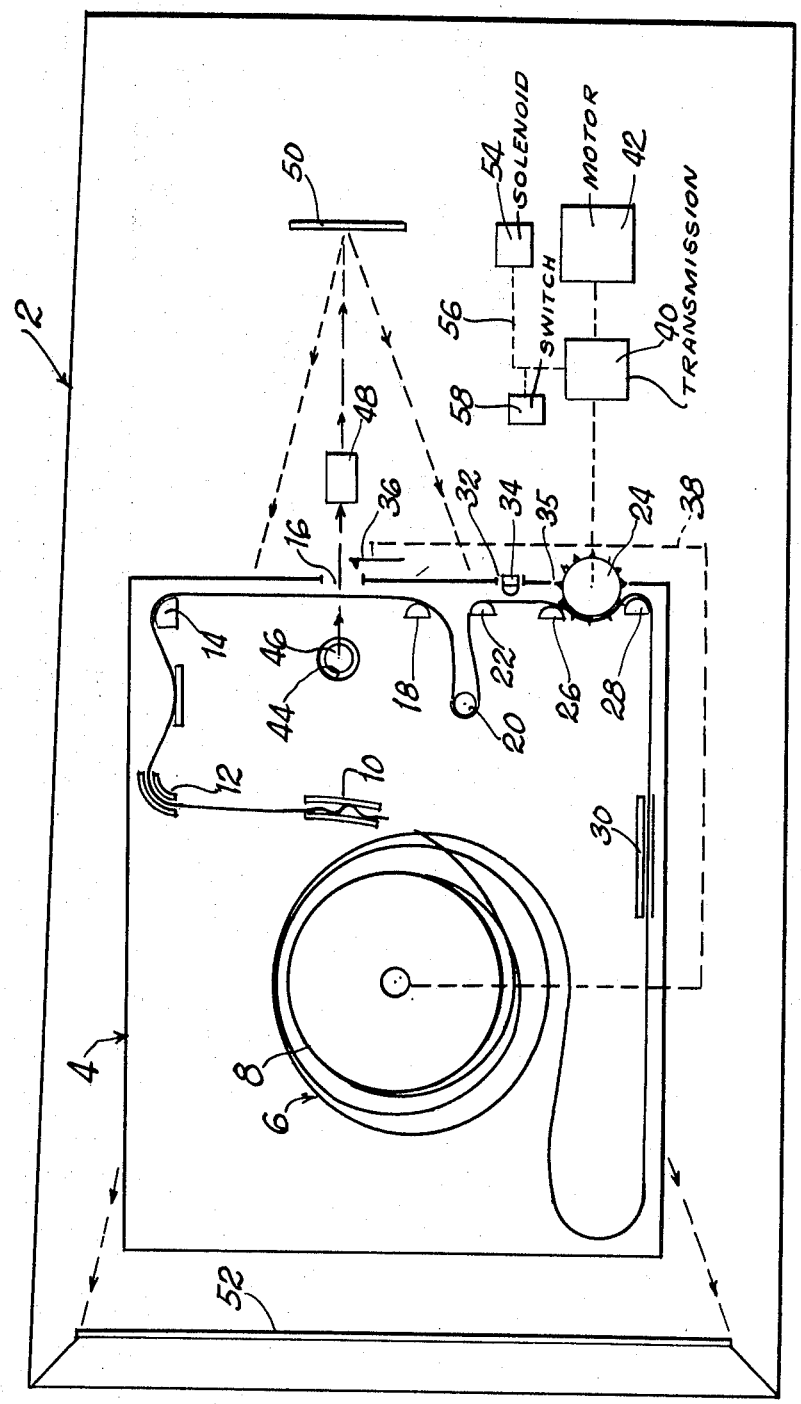

FIG. 1 illustrates a sound motion picture projector embodying the invention. The particular projector illustrated in this figure in schematic fashion is one in which the film is stored in a cartridge of the type where the two ends of the film are secured together so as to form an endless film which may be rerun continuously. A projector of this type is shown in U.S. Pat. No. 3,514,195, issued on May 26, 1970 to O. R. Nemeth. It is to be understood, however, that other and different types of projectors, including the more conventional ones having storage reels and take up reels, may be used.

The projector of FIG. 1 includes a housing 2. A cartridge 4 containing an endless film is provided and may be inserted in an opening in the side of the housing to engage with film drive, projection and sound pick up means in the manner to be described. The endless film is contained within the cartridge in a roll 6. A driven hub 8 engages the innermost convolution of the film and pushes it through a guide channel 10. From the exit end of the guide channel indicated at 12 the film passes to a guide 14 and past a projection aperture 16.

Below the projection aperture 16 the film passes over a guide 18 and from there around a movable element 20 which maintains a compensating loop in the film. The film leaves the compensating loop and passes around another guide 22 and is held against a feed sprocket 24 by means of a pair of guides 26 and 28. After passing around the guide 28, another guide channel 30 is provided. The film exiting from the guide channel 30 reenters the roll 6 so as to be recycled as desired.

The cartridge 4, in addition to including the projection aperture 16 also includes an aperture 32 through which an audio signal pick up head 34 has access to the film. Likewise, an opening 35 is provided in the cartridge for the feed sprocket 24.

The film drive means also includes an intermittent pawl 36 which feeds the film intermittently pass the projection aperture 16 at the same rate at which the feed sprocket is rotating. The various feed elements, that is, the hub 8, feed sprocket 24 and intermittent pawl 36 are connected by a drive means represented by the dotted line connection 38 and are actuated by the output of a transmission means 40, the input of which is constituted by a motor 42.

Another opening 44 in the cartridge accommodates a projection lamp 46 mounted in the housing so that light from the lamp after passing through the film is projected by the projection objective 48 onto the surface of a reflector 50. Not shown in this drawing but positioned in the same plane as the reflector 50 is another reflector which projects the image beam to the left as shown in the drawing so as to cause it to reach a viewing screen 52 mounted in one end of the housing. As noted above, the particular projector illustrated is that shown in U.S. Pat. No. 3,514,195 and reference may be had to that patent for a more detailed description of the projector including its projection system, film drive means and the cartridge.

In accordance with the invention, the projector includes means for stopping the projector when it is desired to display a particular frame as a still picture The apparatus includes a solenoid 54 mounted in the housing and actuating, through a mechanical linkage 56, the transmission 40 so as to disenable the film drive when it is desired to stop the film advance. The particular film drive interrupting means may take a number of forms. For instance, the transmission 40 could be constituted by a combination brake and clutch means operable when the solenoid 54 is energized to disengage the clutch so as to interrupt the drive from the motor 42 and at the same time apply a brake so as to bring the film to a stop at the desired point. A specific mechanism for insuring that the film is brought to a halt at a desired point to insure that the particular frame is accurately framed in the projector and to insure that a shutter forming part of the projector is maintained in an open position, but which forms no part of this invention, is shown in U.S. Pat. No. 3,647,288 to George J. Zahradnik and Arthur A. Pudark issued Mar. 7, 1972 for "Automatic Mechanism For A Motion Picture Projector" and assigned to the same assignee as is this application.

In addition to operating the transmission system 40 so as to stop the film at the desired point, the linkage 56, actuated when the solenoid 54 is energized, is also effective to operate a switch 58 for a purpose to be hereinafter described. In addition, it is desired that when the film is stopped to display a particular frame as a still picture it is desirable to dim the projection lamp 46 and switch means operated by the solenoid 54 may be provided for this purpose.

Figure 2:
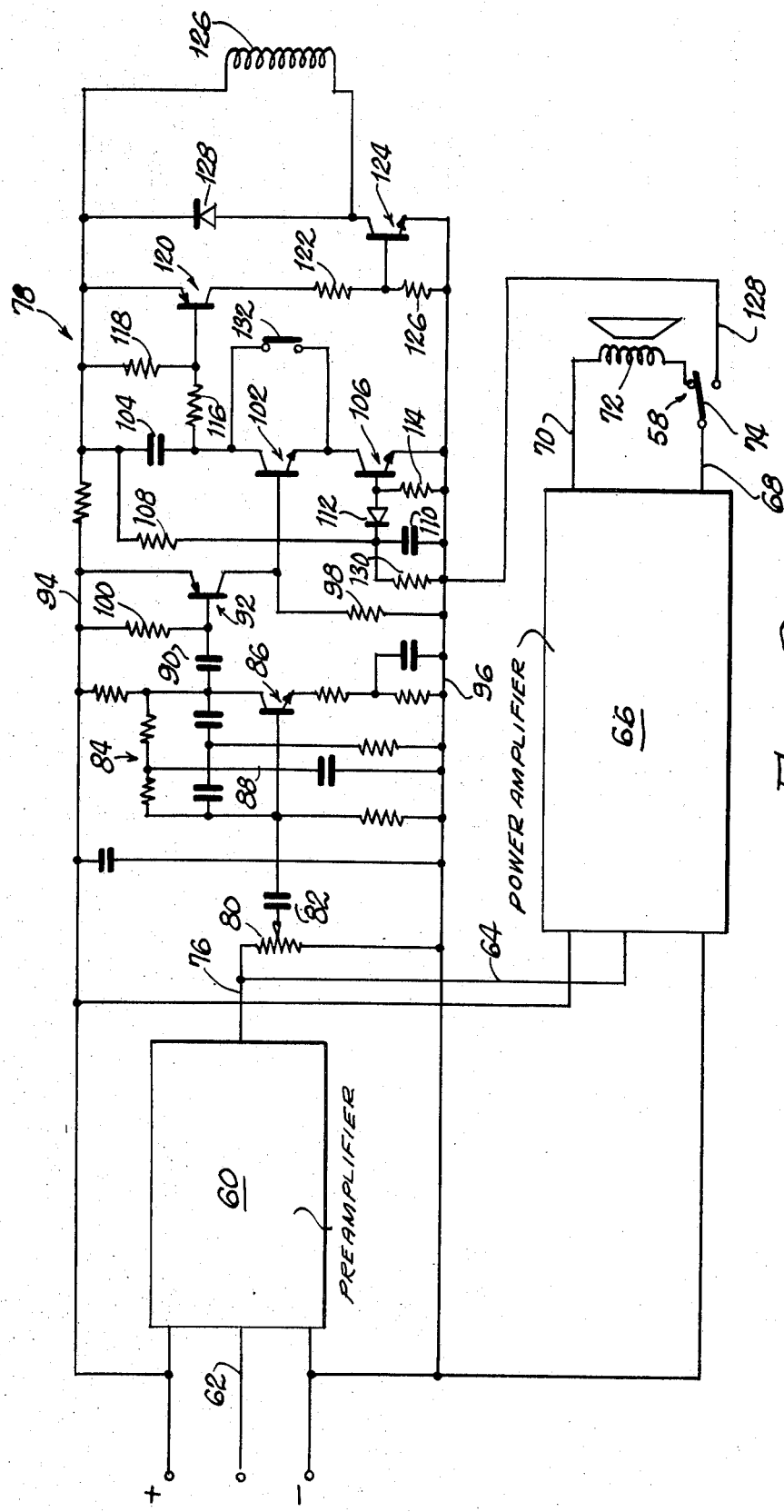

FIG. 2 of the drawing illustrates an embodiment of a control circuit in accordance with the invention. The circuit includes an audio signal preamplifier 60 receiving as an input the signal detected by the audio pick up head 34. This signal is received via an input terminal 62 and after amplification is supplied as an output via a conductor 64 to an audio power amplifier 66. The output of the audio power amplifier appears on the output conductors 68 and 70 and is supplied to the operating coil 72 of a speaker. Included in the audio output circuit is the movable terminal 74 of the switch 58 which in its normal unactuated position connects the speaker to the audio power amplifier 68.

The output of the preamplifier is also supplied via a conductor 76 to the input of the control circuit 78 forming a part of the invention. Inasmuch as the preamplifier, audio power amplifier and control circuit are constituted by solid state electronic components, direct current operating voltage for these elements may be supplied from a conventional rectifying power supply driving its input alternating current from a transformer in the projector (not shown). It is contemplated that the audio signal may be derived from magnetic tape constituting a sound track on film so that the pick up head 34 is a device responsive to variations in the signal recorded on such tape.

In order that the film may be stopped at a desired point, a prerecorded tone is placed on the film sound track. This tone may be superimposed on the audio program material and in one embodiment it has been found desirable to use an 80 Hz signal which is 350 miliseconds in duration. The particular signal suggested was selected in a system where the audio system including the tape, pick up head and amplifiers had a good response in the middle audio range and a low frequency signal such as one of 80 Hz is one which would not be heard by the listener.

Thus, the output of the preamplifier 60 is applied across a potentiometer 80 which acts as a sensitivity control. The audio signal is then coupled by a capacitor 82 to a narrow band-pass amplifier 84 including an NPN transistor 86 and a filter circuit 88 which is constituted by a combination of resistive and capacitive elements connected in the manner well known in the art so as to pass only signals of a desired frequency. As indicated, the frequency selected in one embodiment was 80 Hz so that the output of the band-pass amplifier 84 appearing on the collector of the transistor 86 is only signals of that frequency amplified. That output is coupled via a capacitor 90 to the base of a PNP transistor 92 having its emitter connected to the positive bus 94 while its collector was connected to the negative bus 96 through a resistor 98. Connected between the positive bus 94 and the base of the transistor 92 is a biasing resistor 100. The value of the biasing resistor is selected so as to permit conduction of the transistor 92 only in response to negative going signals exceeding a predetermined value. By this means an operating voltage level is established to insure that there is no response to other 80 Hz signals which do exceed this level and thus the possibility of undesired stops is lessened.

The collector of the transistor 92 is directly coupled to the base of a transistor 102. The transistor 102 has its collector coupled through a capacitor 104 to the positive bus 94 while its emitter is connected to the collector of a transistor 106, the emitter of which is connected to the negative bus 96. A time delay circuit is provided by a resistor 108 connected to the positive bus 94 and to a capacitor 110. The time delay circuit also includes a zener diode 112 having its anode connected to one end of a resistor 114 the other end of which is connected to the negative bus 96. The base of the transistor 106 is connected to the junction of the zener diode and resistor 114 so that its conduction is controlled by current passed by the zener diode when it conducts. As may be seen, the transistor 106 is arranged to control the conduction of the transistor 102 depending on whether it itself is conducting or non-conducting.

The collector of the transistor 102 is connected to one end of a resistor 116 the other end of which is connected through a resistor 118 through the positive bus 94 and to the base of a PNP transistor 120. The emitter of the transistor 120 is connected through a transistor 122 to the base of a transistor 124 and through a resistor 126 to the negative bus 96. Connected in series with the collector of the transistor 124 and the positive bus 94 is the operating coil 126 of the solenoid 54. A diode 128 is poled with its cathode connected to the positive bus 124 in parallel with the operating coil 126 to act as a "free wheeling diode".

The operation of the circuit is as follows. The audio input signal as an output of the preamplifier 60 is supplied as an input to the circuit 78 and upon the receipt of an audio signal of the selected frequency that signal would be amplified by the band-pass amplifier 84 and supplied as an input to the base of the transistor 92. By virtue of the positive bias supplied to that transistor only the negative portions of the preselected tone signal in excess of a predetermined value would be further amplified and supplied as an input to the base of the transistor 102. Assuming conduction of the transistor 106, the transistor 102 will then conduct and amplify those signals which will appear in the form of successive pulses on its collector. Those pulses will be integrated by the combined effect of the capacitor 104 and resistors 116 and 118 and supplied as a continuous signal as an input to the base transistor 120 causing it to conduct. The conduction of the transistor 120 in turn causes the transistor 124 to conduct energizing the solenoid operating coil 126. The energization of the solenoid coil 126 would then be effective to cause movement of its connections 56 to the transmission means 40 so as to stop the movement of the film at the desired point. At the same time the transmission 40 is operated by the solenoid 54, the switch 58 is operated causing its contact 74 to open the connection to the speaker coil 72 and complete a circuit via a conductor 128 through a resistor 130 connected to the junction of the capacitor 110 and zener diode 112.

When a sound motion picture projector is started up, there is a period where the film and the magnetic sound track thereon is moving from zero speed to its operating speed. During this interval a signal on the sound track thereof of higher frequency may appear lower because of the reduced speed. For example, if 80 Hz is selected as the desired frequency a recorded signal of 160 Hz which is otherwise intended as an audio signal may momentarily supply a 80 Hz input to the preamplifier. Were this signal to be effective to actuate the control circuit the solenoid 126 would be energized and stop the movement of the film even though it was not intended. To eliminate this problem the time delay circuit is provided. Thus, when the projector has stopped, the capacitor 110 is held at ground. At start up this capacitor charges from the positive bus 94 through the resistor 108. A time delay is therefore provided while the capacitor 110 is charging to a value sufficient to cause zener 112 to conduct thereby supplying a positive going signal at the base of the transistor 106 whereby it may conduct. By virtue of this time delay an interval is provided during which the film can accelerate to its normal operating speed. Thus, spurious tone signals will not be effective to energize the solenoid 126 as the transistor 102 cannot conduct until the transistor 106 has an appropriate positive signal supplied to its base. It should be noted that this time delay also provides another benefit. It prevents transients which may occur when power is applied from operating the solenoid as such transients would not be effective during the charging interval of the capacitor 110 and the consequent non-conduction of transistor 106.

As pointed out above, when the solenoid is energized, the contacts of switch 58 disconnect the speaker coil from the output terminal 68 which output terminal is the negative bus of that amplifier and connects that terminal to the conductor 128. When this occurs, the capacitor 110 which is now charged fully permitting the conduction of the transistor 106 discharges to the negative bus through the resistor 130. The resistor 130 is optional as it is of low value and is merely desired to protect the contacts of switch 58 from high current due to the discharge of capacitor 110. When the capacitor has discharged to a predetermined value, the transistor 106 ceases conduction as does the transistor 102 causing the solenoid coil 126 to become deenergized. The time necessary for the capacitor 110 to discharge is determined by the energization period of the solenoid.

Generally, it is desired that it be energized only long enough to operate a stopping mechanism such as that shown in the patent to George J. Zahradnski and Arthur A. Pudark, referred to above. When the particular frame has been projected a desired timed, the mechanism may be operated to cause the projector to operate as a motion picture as explained in that application. When the solenoid is deenergized, the switch terminal 74 again connects the speaker coil 72 to the output terminal 68 interrupting the discharge circuit for the capacitor 110 permitting it to charge up once again through the resistor 108 so that the control circuit is rendered effective to respond to the next time the predetermined tone signal is detected.

In order that a manual stopping means may be provided, a pushbutton switch 132 is connected across the transistor 102. Upon the momentary closure of this switch, the transistor 102 is shunted and the transistor 120 will then conduct causing the transistor 124 to conduct as before energizing the coil 126. After the actuation of the solenoid, the projector will hold the desired frame until it is restarted as before. Thus, the apparatus provides both an automatic and manually operated means whereby a selected frame can be displayed as a still picture by a motion picture projector.

Obviously, various modifications may be made in the invention and it is intended by the claims to cover all such modifications which are encompassed within their scope.

What is claimed as new and desired to be secured by Letters Patent of the United States is:

1. In a sound motion picture projector including: means for storing film to be projected; means for projecting images from said film onto a viewing surface, means, including transmission means, for advancing said film past a projection means, and means for detecting and amplifying audio signals recorded on a track on said film; the improvement comprising: control means responsive to a discrete audio signal recorded on said film for stopping said film advance, said control means including circuit means for amplifying a discrete audio signal, means connected to said circuit means and operable in response to the amplified discrete audio signal to disenable said film advance means, said circuit means including (1) a band-pass amplifier for amplifying only a selected range of frequencies recorded on said film track, and (2) means for disenabling said circuit means for a predetermined time after said projector is started.

2. The projector of claim 1 wherein said means for disenabling said film advance means includes means for interrupting and stopping said transmission means.

3. The apparatus of claim 2 wherein said circuit means includes a solenoid energizable in response to the detected presence of the discrete audio signal on the track on said film and said means for interrupting and stopping said transmission means is operatively connected to the armature of said solenoid.

4. The apparatus of claim 3 wherein said circuit means also includes means for amplifying unipolar portions of said discrete tone signal in excess of a predetermined value; means for integrating the amplified unipolar portions; a solenoid operating coil; and amplifying means coupling the output of said integrating means to said solenoid operating coil to cause said coil to be energized in response to the presence of an output from said integrating means.

5. The apparatus of claim 4 wherein said amplifying means coupling the output of said integrating means to said solenoid includes a first transistor having its input connected to the output of said means for amplifying unipolar portions of the discrete tone signal and its output connected to said integrating means; a second transistor connected in series with said first transistor, whereby the ability of said first transistor to conduct is controlled in response to the conductive state of said second transistor; a time delay circuit connected to the input electrode of said second transistor, whereby said second transistor is prevented from conducting for a predetermined time after said projector is turned on.

6. The apparatus of claim 5 wherein said time delay circuit includes a resistor and capacitor connected in series; means for charging said capacitor through said resistor; and a zener diode connected to the junction of said capacitor and said resistor and to the input electrode of said second transistor, whereby said second transistor will be rendered conductive when said capacitor is charged to the zener voltage.

* * * * *